E. C. SCHULTZ.
EMERGENCY TIRE.
APPLICATION FILED MAR. 10, 1920.

1,355,785.

Patented Oct. 12, 1920.

INVENTOR
Emil C. Schultz.
BY
James J. Sheehy
ATTORNEYS

UNITED STATES PATENT OFFICE.

EMIL C. SCHULTZ, OF STREATOR, ILLINOIS.

EMERGENCY-TIRE.

1,355,785.  Specification of Letters Patent.  Patented Oct. 12, 1920.

Application filed March 10, 1920. Serial No. 364,864.

*To all whom it may concern:*

Be it known that I, EMIL C. SCHULTZ, a citizen of the United States, residing at Streator, in the county of La Salle and State of Illinois, have invented new and useful Improvements in Emergency-Tires, of which the following is a specification.

My present invention pertains to tires, and it contemplates the provision in a tire of means whereby a worn or punctured tire may be readily and quickly replaced when occasion demands.

One of the objects of the invention is the provision of an emergency tire that is formed in sections, whereby it may not only be easily carried in an automobile but which may also be readily applied to any size rim.

Figure 1:
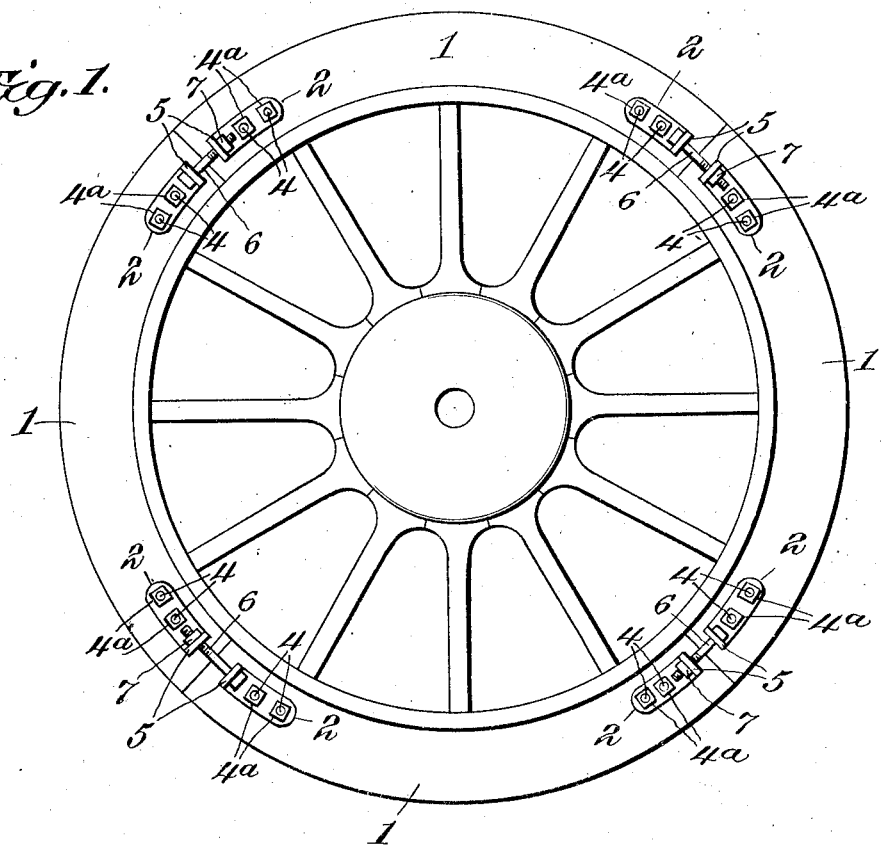
Figure 2:
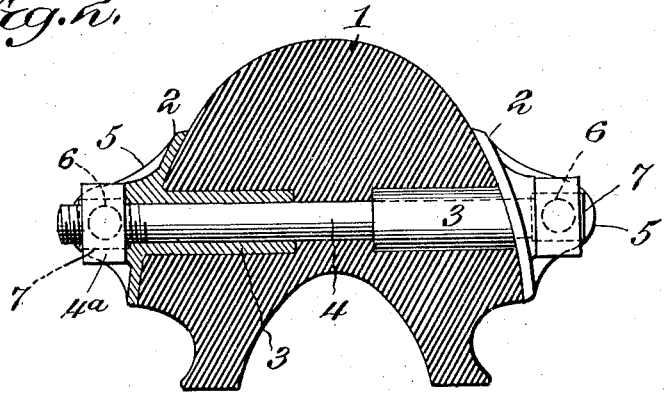

Other objects and characteristic features of the invention will be fully understood from the following description and claim, when the same are read in connection with the drawings accompanying and forming part of this specification, in which:

Figure 1 is a side elevation of my novel tire as the same appears when applied to a vehicle wheel, and, Fig. 2 is a cross-section of Fig. 1.

Similar numerals are used to designate the corresponding elements in both of the views of the drawings.

The tire comprises the sections, 1, but I would have it understood that in the future practice of the invention, a greater or less number of sections may be employed in the discretion of those using my invention. These sections 1 are arranged in the rim of a vehicle wheel in the ordinary well known manner and each section is provided on each of its ends with two (more or less) through and through openings, which serve for the reception of the portions 3 of plates 2.

The plates 2 are provided on their inner ends with portions 5 in which I form bolt or pin receiving apertures. These plates 2 are secured on their complementary sections by means of the bolts 4 that enter the portions 3 of the plates 2 and extend across the tire to the opposite side thereof where they are placed in the portions 3 of the opposing plates. The bolts 4 are provided with nuts 4ª.

It will be apparent by reference to Fig. 1 that after the plates 2 have been secured to their respective sections, I then pass a bolt 6 through the aperture of the portion 5 of each plate and thread a nut 7 on one end of the bolt 6.

It will be manifest, from the foregoing, that because of the construction illustrated, the sections 1 may be applied to any size wheel by simply cutting a slight portion off of the abutting walls of each section.

In the practical use of my device the plates 2 are secured to their respective sections and are held thereto by means of the nuts 4ª and bolts 4. After each section is provided with plates it is a simple matter by passing the bolts 6 through the portions 5, to manipulate the nuts 7 and increase or decrease the circumference of the sections.

It will be readily apparent that my device is of great utility to a motorist for the reason that it may be carried under the seat or in any other suitable place in an automobile and when occasion arises it may be placed on the rim and hence will obviate the necessity and the well known practice of running the automobile on a deflated tire or on the rim itself.

Having described my invention what I claim and desire to secure by Letters Patent is:—

In means for the purpose set forth the combination with the rim of a vehicle, of tire sections having through and through openings provided at the ends thereof with respect to their width and means for securing the sections on the rim and comprising, plates adapted to rest on each side of the sections, ears formed integral on the plates, bolt holes formed in the plates that register with the openings of the sections, other bolt holes formed in the ears of the plates, bolts adapted to enter the bolt holes of the plates and pass through the openings of the sections, nuts adapted to retain the bolts on the sections, and bolts adapted to enter the bolt holes of the ears and nuts adapted to be secured on the bolts to prevent casual displacement of the bolts from the ears whereby the opposing sets of plates are secured to each other.

In testimony whereof I have hereunto set my hand in presence of two subscribing witnesses.

EMIL C. SCHULTZ.

Witnesses:
 FRANK BUTLER,
 O. F. JOHNSON.